US012663871B2

(12) United States Patent     (10) Patent No.:   US 12,663,871 B2
Yoon et al.            (45) Date of Patent:     Jun. 23, 2026

(54) DEVICE AND METHOD FOR PROVIDING HAPTICS BASED ON CHARACTER MOTION, AND STORAGE MEDIUM STORING INSTRUCTIONS TO PERFORM METHOD FOR PROVIDING HAPTICS BASED ON CHARACTER MOTION

(71) Applicant: Korea Advanced Institute of Science and Technology, Daejeon (KR)

(72) Inventors: Sang Ho Yoon, Daejeon (KR); Kyungeun Jung, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 18/821,544

(22) Filed: Aug. 30, 2024

(65) Prior Publication Data

US 2025/0076988 A1     Mar. 6, 2025

(30) Foreign Application Priority Data

Sep. 1, 2023    (KR) ........................ 10-2023-0116552

(51) Int. Cl.
    *G06F 3/01*       (2006.01)
    *G06T 7/246*      (2017.01)
    *G06T 7/66*       (2017.01)
(52) U.S. Cl.
    CPC .............. *G06F 3/016* (2013.01); *G06T 7/246* (2017.01); *G06T 7/66* (2017.01)
(58) Field of Classification Search
    CPC . G06F 3/016; G06T 7/011; G06T 7/66; G06T 7/246
    See application file for complete search history.

(56) References Cited

U.S. PATENT DOCUMENTS

| | | | |
|---|---|---|---|
| 6,191,798 B1 * | 2/2001 | Handelman | G06T 13/40 |
| | | | 345/475 |
| 10,022,628 B1 * | 7/2018 | Matsumiya | A63F 13/577 |
| 10,281,987 B1 * | 5/2019 | Yang | G06F 3/0426 |
| 2018/0232051 A1 * | 8/2018 | Wu | G06V 40/23 |
| 2021/0209808 A1 * | 7/2021 | Engelland-Gay | G06T 17/205 |
| 2022/0079510 A1 * | 3/2022 | Robillard | G16H 20/30 |
| 2022/0386942 A1 * | 12/2022 | Diaz-Arias | A61B 5/45 |

FOREIGN PATENT DOCUMENTS

| | | |
|---|---|---|
| KR | 10-0835297 B1 | 6/2008 |
| KR | 10-2016-0012704 A | 2/2016 |
| KR | 10-2017-0097663 A | 8/2017 |

\* cited by examiner

*Primary Examiner* — Sanghyuk Park

(74) *Attorney, Agent, or Firm* — Knobbe, Martens, Olson & Bear, LLP

(57)        ABSTRACT

Proposed is a method for providing haptics based on character motion. The method may include obtaining skeleton data for motion of a character included in contents, and determining a dynamic point, a reference point, and a center point for the motion of the character based on the skeleton data. The method may also include calculating a rendering point for generating haptic vibration based on the dynamic point, the reference point, and the center point. The method may further include generating the haptic vibration at a position corresponding to the motion within at least one of haptic devices worn on a user, an animal, or an object based on the rendering point.

15 Claims, 11 Drawing Sheets

| Symbol | Label |
|---|---|
| ——— | Edges of MST |
| ● (black) | Active Joint |
| ◐ (light) | Torso Center of Mass |
| ○ (Root Joint) | Root Joint |
| ◉ (dotted) | MST Dynamic Point |

—— Edges of MST

● Active Joint

◐ Torso Center of Mass

◒ Root Joint

● MST Dynamic Point

DEVICE AND METHOD FOR PROVIDING HAPTICS BASED ON CHARACTER MOTION, AND STORAGE MEDIUM STORING INSTRUCTIONS TO PERFORM METHOD FOR PROVIDING HAPTICS BASED ON CHARACTER MOTION

CROSS-REFERENCE TO RELATED APPLICATION

This application claims priority to Korean Patent Application No. 10-2023-0116552 filed on Sep. 1, 2023, the entirety of which is incorporated herein by reference for all purposes.

STATEMENT REGARDING GOVERNMENT SPONSORED RESEARCH OR DEVELOPMENT

This work was partly supported by National Research Foundation of Korea (NRF) grant funded by Korea government (MSIT; Ministry of Science and ICT) (No. 2022R1A4A503368912, The Convergence Research Support Project for Motion•Tactile•Cognitive Interactions Mediated by Metaverse Avatars, and No. RS-2023-00210001, Research on a Wearable Multimodal Sensor Framework for Providing Adaptive Interactions in Extended Reality) and partly supported by Korea Institute of Science and Technology Information (KISTI) (No. CRC21012-310, Development of Element Technologies for Enhancing High-Quality Immersion and Co-Presence).

TECHNICAL FIELD

The present disclosure relates to a technology that provides haptics to a user based on character motion included in contents.

BACKGROUND

Along with the development of cultural industry technology, digitalization of various cultural and performing arts is accelerating. Research and development has been conducted with a focus on digitalization such as a realistic 3D graphic rendering technology for game and movie industries as well as a virtual reality concert using motion capture and a digital work using NFT.

SUMMARY

One aspect is a technology for transmitting haptics corresponding to a character's motion to a user based on information on joints that constitute the character's motion included in contents, etc.

Another aspect is a technology for extracting rendering points based on joint information that constitutes the character's motion depending on skeleton data for the character and transmitting haptics to a user based on the rendering points.

Another aspect is a method for providing haptics based on character motion, that comprises: obtaining skeleton data for motion of a character included in contents; determining a dynamic point, a reference point, and a center point for the motion of the character based on the skeleton data; calculating a rendering point for generating haptic vibration based on the dynamic point, the reference point, and the center point; and generating the haptic vibration at a position corresponding to the motion within at least one of haptic devices worn on a user, an animal, or an object based on the rendering point.

The determining the reference point, the dynamic point, and the center point may include, based on the skeleton data, determining joint information about the character that constitutes the motion and center of gravity information about the character during the motion, determining a first joint as the dynamic point and a second joint as the reference point among a plurality of joints of the character, based on the joint information, and determining the center point based on the center of gravity information.

The joint information may include at least one of a position, a speed, and a movement direction of a plurality of joints of the character that constitutes the motion, and the center of gravity information includes at least one of a position, a speed, and a movement direction of the center of gravity for a body part of the character that constitutes the motion.

The first joint may be set as a joint in which an amount of change in the position and the speed among the plurality of joints during the motion is greater than or equal to a preset first reference, and the second joint may be set as a joint in which an amount of change in the position and the speed among the plurality of joints during the motion is smaller than or equal to a preset second reference.

The dynamic point may be set as a left hand joint or a right hand joint of the character, and the reference point is set as a right shoulder joint or a left shoulder joint of the character.

The dynamic point may be set as a left foot joint or a right foot joint of the character, and the reference point is set as a left pelvic joint or a right pelvic joint of the character.

The calculating the rendering point may include determining a feature point of a polygon including the dynamic point, the reference point, and the center point, based on a position, a speed, and a movement direction of each of the dynamic point, the reference point, and the center point, and calculating the feature point as the rendering point.

The calculating the rendering point may include calculating the rendering point according to the following Equation:

$$MSP_{DP} = J_c + \frac{(J_A - J_C) \cdot w_{Active} + (J_R - J_c) \cdot w_{Root} + (J_T - J_c) \cdot w_{Torso}}{w_{Active} + w_{Root} + w_{Torso}}$$

(where $MSP_{DP}$ is a rendering point, $J_A$ is a dynamic point, $J_C$ is a center of gravity before performing motion of the character, $J_R$ is a reference point, $J_T$ is a center point, $w_{Active}$ is a weighted value of the dynamic point, $w_{Root}$ is a weighted value of the reference point, and $w_{Torso}$ is a weighted value of the center point).

The generating the haptic vibration may include generating a haptic effect at the rendering point to control vibration intensity and time of at least one of haptic devices respectively disposed at different positions.

Another aspect is a device for providing haptics based on character motion, that comprises: a memory configured to store one or more instructions; and a processor configured to execute the one or more instructions stored in the memory, wherein the instructions, when executed by the processor, cause the processor to: obtain skeleton data for motion of a character included in contents; determine a dynamic point, a reference point, and a center point for the motion of the character based on the skeleton data; calculate a rendering point for generating haptic vibration based on the dynamic point, the reference point, and the center point; and generate the haptic vibration at a position corresponding to the motion within at least one of haptic devices worn on a user, an animal, or an object based on the rendering point.

Another aspect is a computer program including computer executable instructions stored in a non-transitory computer readable storage medium, wherein the instructions, when executed by a processor, cause the processor to perform method for providing haptics based on character motion, the method comprising: obtaining skeleton data for motion of a character included in contents; determining a dynamic point, a reference point, and a center point for the motion of the character based on the skeleton data; calculating a rendering point for generating haptic vibration based on the dynamic point, the reference point, and the center point; and generating the haptic vibration at a position corresponding to the motion within at least one of haptic devices worn on a user, an animal, or an object based on the rendering point.

According to an aspect, it is possible to transmit haptics corresponding to the character's motion to a user based on information on joints that constitute the character's motion included in contents, etc.

In addition, according to another aspect, it is possible to extract rendering points based on joint information that constitutes the character's motion depending on skeleton data for the character and transmit haptics to a user based on the rendering points.

BRIEF DESCRIPTION OF THE DRAWINGS

FIG. 2 is a block diagram of a haptic providing device based on character motion according to an embodiment of the present disclosure.

FIGS. 4 and 5 are diagrams for explaining extraction of a rendering point according to an embodiment of the present disclosure.

DETAILED DESCRIPTION

Figure 1:
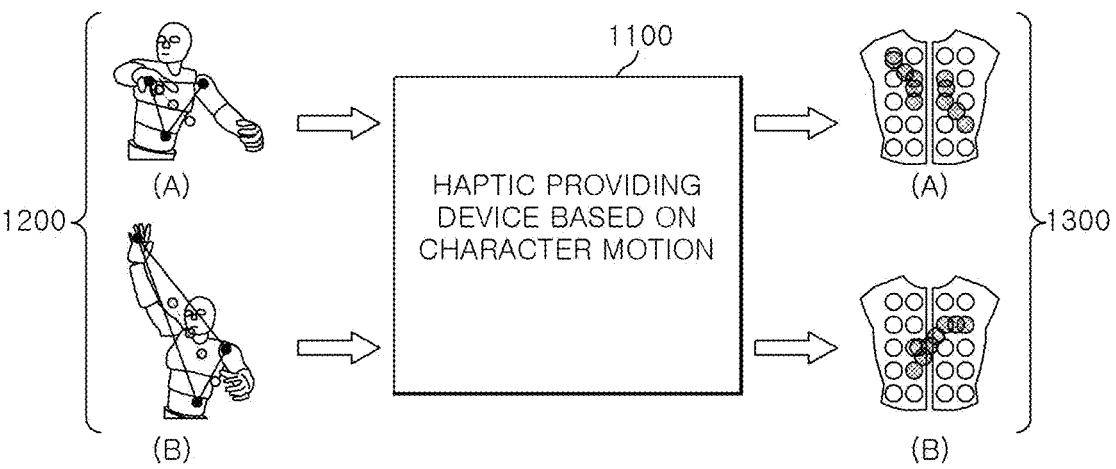
FIG. 1 is a diagram for explaining a haptic providing device based on character motion according to an embodiment of the present disclosure.

Currently, the development of a virtual/augmented/mixed reality-related device and interface under the term of metaverse is also progressing at a fairly rapid pace. Although the metaverse mainly means a virtual reality (VR) platform due to current technological limitation, after 10 to 20 years, the combination of an augmented/mixed reality (AR/MR) platform and various devices in a wearable form is expected to be one of the forms of the future metaverse by virtue of the technological advancement in computing/display/hardware. Currently, with the development of extended reality technology, new types of performance methods such as an AR concert and an online performance service using digital data have emerged, away from the simple cultural and performing art experience method based on a 2D screen or a face-to-face performance. Although the non-face-to-face performance form as such has been proposed, there is still existing a lack of a sense of realism/immersiveness. In order to compensate for this, a non-face-to-face haptic feedback method that detects changes in sound intensity or pixel value of a 2D image and transmits them to simple vibration and tactile sensation has also been studied.

However, regarding the conventional haptic feedback rendering technology developed to date, research on the audio-to-haptic rendering pipeline (audio-to-tactile), which replaces audio files with haptics, and the vision-to-haptic rendering pipeline (vision-to-tactile), which replaces vision data with haptics, has already been conducted. Nevertheless, no research has been attempted to render the features and motions of an avatar, which serves as the most important medium in the metaverse, with the haptic feedback. Although there is research that provides the haptic feedback by extracting the feature points of a scene from a 2D image movie, it has limitations in that the vibration stimulation is not detailed and that the motions of avatar objects cannot be felt as they are.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

The terms such as ' . . . unit' and ' . . . group' as used below refer to a unit that processes at least one function or motion, and may be implemented as a hardware, a software, or a combination of the hardware and the software.

FIG. 1 is a diagram for explaining a haptic providing device based on character motion according to an embodiment of the present disclosure.

Referring to FIG. 1, if 2D or 3D contents are input, the haptic providing device 1100 based on character motion can extract a character that performs a specific motion from the contents. The haptic providing device 1100 based on character motion can extract skeleton data 1200 for the character based on the extracted character. The haptic providing device 1100 based on character motion can control a haptic device 1300 to extract points such as joints of the character that performs a specific motion based on the skeleton data and generate haptics corresponding to the specific motion of the character based on the extracted points.

That is, according to an embodiment of the present disclosure, the haptic providing device 1100 based on character motion can control the haptic device 1300 to, when the character performs a first motion 1200 A and a second motion 1200 B, extract points such as joints corresponding to each motion, generate vibration according to a first haptic 1300 A in response to the first motion 1200 A based on the extracted points, and generate vibration according to a second haptic 1300 B in response to the second motion 1200 B based on the extracted points.

Hereinafter, a more detailed explanation of the haptic providing device 1100 based on character motion shown in FIG. 1 will be described with reference to FIGS. 2 to 11.

Figure 2:
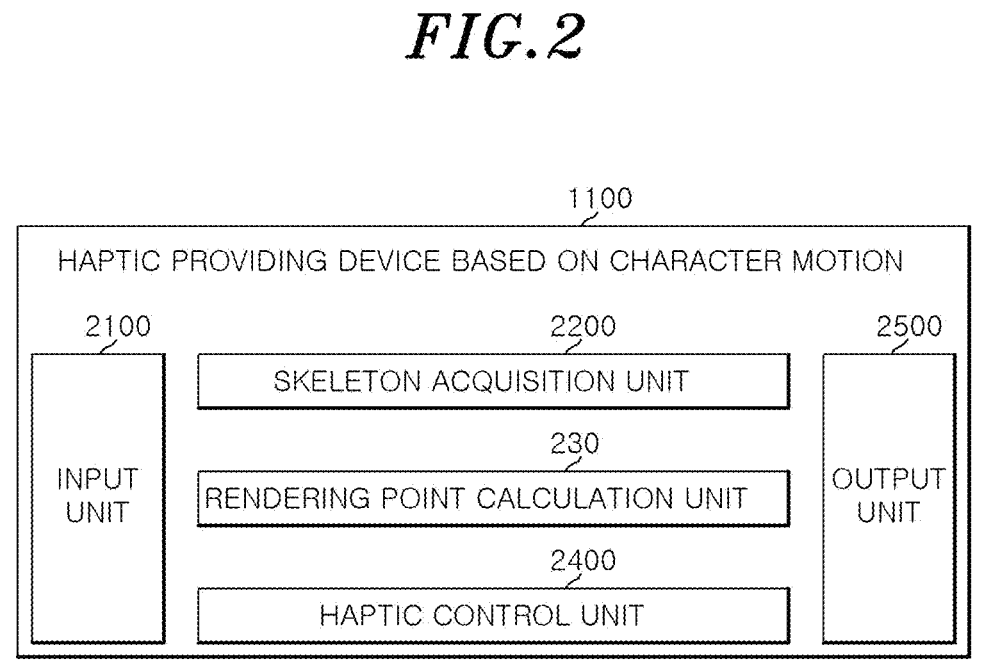

FIG. 2 is a block diagram of a haptic providing device based on character motion according to an embodiment of the present disclosure.

Referring to FIG. 2, the haptic providing device 1100 based on character motion may include an input unit 2100, a skeleton acquisition unit 2200, a rendering point calculation unit 2300, a haptic control unit 2400, and an output unit 2500.

The input unit 2100 may receive data required to provide haptics to a user based on character motion through a wired or wireless communication system.

In an embodiment, the input unit 2100 may receive contents subjected to haptic provision from an external device (not shown). Herein, the contents may be 2D or 3D image, video, or the like, and include a character such as people or animals.

In an embodiment, the input unit 2100 may receive information on a haptic device from an external device (not shown) in order to control the haptic device according to character's motion. Herein, the information on the haptic device may mean all information about the haptic device, such as a vibration generating module attached to the haptic device, a position of the vibration generating module, a controllable vibration pattern, vibration intensity, and vibration time.

The skeleton acquisition unit 2200 may detect a character performing motion from contents and extract the detected character. The skeleton acquisition unit 2200 may extract skeleton data for motion of the character from the extracted character.

In an embodiment, the skeleton data may include joint information, center of gravity information, etc. of the character performing motion. The joint information may include information such as a position, a speed, and a movement direction of multiple joints according to motion. The center of gravity information may include information such as a position, a speed, and a movement direction of the center of gravity for a body part that constitutes motion of the character's body.

In an embodiment, the body part constituting motion may mean an upper body part of the character when the motion of the character is a movement of the upper body part of the character. Further, the body part constituting motion may mean a lower body part of the character when the motion of the character is a movement of the lower body part.

In an embodiment, in case the contents are 2D contents, the skeleton acquisition unit 2200 may extract 2D skeleton data, or may extract 3D skeleton data by converting the 2D contents to 3D contents.

In an embodiment, the skeleton acquisition unit 2200 may extract skeleton data from contents based on the well-known technology such as a deep learning-based model.

The rendering point calculation unit 2300 may calculate a dynamic point, a reference point, and a center point for motion of the character from the skeleton data. The rendering point calculation unit 2300 may calculate a rendering point for generating haptic vibration based on the dynamic point, the reference point, and the center point.

In an embodiment, the rendering point calculation unit 2300 may obtain information on joints of the character constituting motion and information on the center of gravity of the character during motion, from the skeleton data. The rendering point calculation unit 2300 may determine at least one first joint as the dynamic point and at least one second joint as the reference point among a plurality of joints of the character, based on the joint information. The rendering point calculation unit 2300 may determine at least one center point based on the center of gravity information.

In an embodiment, the first joint may be a joint in which an amount of change in the position and the speed among a plurality of joints during motion is greater than or equal to a preset first reference, and the second joint may be a joint in which an amount of change in the position and the speed among the plurality of joints during motion is smaller than or equal to a preset second reference. For example, the dynamic point may be a character's left hand joint (or right hand joint), and the reference point may be a character's right shoulder joint (or left shoulder joint). In addition, the dynamic point may be a character's left foot joint (or right foot joint), and the reference point may be a character's left pelvic joint (or right pelvic joint).

In an embodiment, the rendering point calculation unit 2300 may determine feature points of the polygon consisting of a dynamic point, a reference point, and a center point based on a position, a speed, and a movement direction of each of the dynamic point, the reference point, and the center point, and may calculate them as rendering points.

In an embodiment, the rendering point calculation unit 2300 may calculate the rendering point according to Equation 1 below.

$$MSP_{DP} = J_c + \frac{(J_A - J_C) \cdot w_{Active} + (J_R - J_c) \cdot w_{Root} + (J_T - J_c) \cdot w_{Torso}}{w_{Active} + w_{Root} + w_{Torso}} \qquad \text{[EQUATION 1]}$$

wherein $MSP_{DP}$ is a rendering point, $J_A$ is a dynamic point, $J_C$ is a center of gravity before performing motion of the character, $J_R$ is a reference point, $J_T$ is a center point, $w_{Active}$ is a weighted value of the dynamic point, $w_{Root}$ is a weighted value of the reference point, and $w_{Torso}$ is a weighted value of the center point. According to Equation 1 above, by assigning the weight value to the dynamic point, the reference point, and the center point, it becomes possible to provide haptics that are weighted to the points which must be considered more important in the existing center of gravity and the joints with greater movement.

The haptic control unit 2400 may control a plurality of haptic devices to provide haptics corresponding to motion of the character based on the rendering point.

In an embodiment, the haptic control unit 2400 may generate a haptic effect at a rendering point by controlling vibration intensity and time of at least one haptic device.

In an embodiment, the plurality of haptic devices may be disposed at different positions from a user.

In an embodiment, the plurality of haptic devices may be implemented as a wearable device such as a vest that the user can wear.

The output unit 2500 may transmit a control signal for controlling the haptic device to the haptic device using a wired or wireless communication system.

Figure 3:
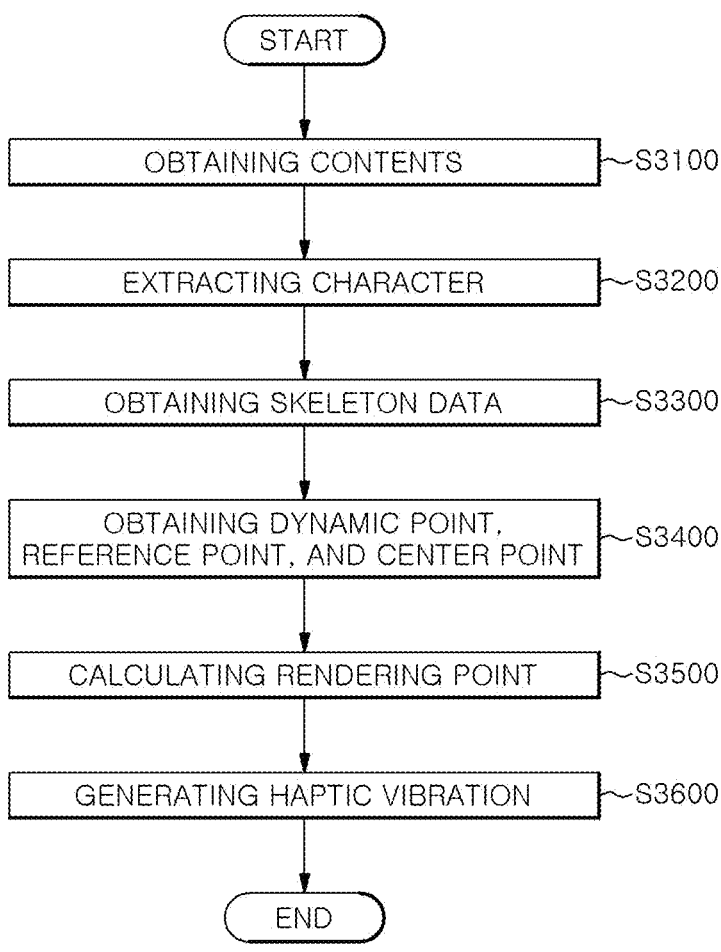
FIG. 3 is a flowchart of a method for providing haptics based on character motion according to an embodiment of the present disclosure.

FIG. 3 is a flowchart of a method for providing haptics based on character motion according to an embodiment of the present disclosure.

Hereinafter, the above method will be described as an example of being performed by the haptic providing device 1100 based on character motion shown in FIG. 1.

In step S3100, the haptic providing device 1100 based on character motion may receive data required to provide haptics to a user based on character motion through a wired or wireless communication system.

In an embodiment, the haptic providing device 1100 based on character motion may receive contents subjected to haptic provision from an external device (not shown). Herein, the contents may be 2D or 3D image, video, or the like, and include a character such as people and animals.

In an embodiment, the haptic providing device 1100 based on character motion may receive information about a haptic device from an external device (not shown) in order to control the haptic device according to character's motion. Herein, the information about the haptic device may mean all information about the haptic device, such as a vibration generating module attached to the haptic device, a position of the vibration generating module, a controllable vibration pattern, vibration intensity, and vibration time.

In step S3200, the haptic providing device 1100 based on character motion may detect a character performing motion from contents and extract the detected character.

In an embodiment, the haptic providing device 1100 based on character motion may detect a character included in the contents based on an object detection model, etc., and extract the detected character.

In step S3300, the haptic providing device 1100 based on character motion may extract skeleton data for character's motion from the character.

In an embodiment, the skeleton data may include joint information, center of gravity information, etc. of the char-acter that performs motion. The joint information may include information about a position, a speed, a movement direction, etc. of a plurality of joints according to the motion. The center of gravity information may include information about a position, a speed, a movement direction, etc. of the center of gravity for a body part that constitutes motion of the character's body.

In an embodiment, the body part constituting motion may mean an upper body part of the character in case motion of the character is a movement of the upper body part of the character. In addition, the body part constituting motion may mean a lower body part of the character in case motion of the character is a movement of the lower body part.

In an embodiment, when the contents are 2D contents, the haptic providing device 1100 based on character motion may extract 2D skeleton data, or extract 3D skeleton data by converting the 2D contents to 3D contents.

In an embodiment, the haptic providing device 1100 based on character motion may extract skeleton data from contents based on the well-known technologies such as a deep learning-based model.

In step S3400, the haptic providing device 1100 based on character motion may calculate a dynamic point, a reference point, and a center point for motion of the character from the skeleton data.

In an embodiment, the haptic providing device 1100 based on character motion may obtain joint information of the character constituting motion and center of gravity information for motion of the character from the skeleton data. The rendering point calculation unit 2300 may determine at least one first joint as the dynamic point and at least one second joint as the reference point among a plurality of joints of the character, based on the joint information. The rendering point calculation unit 2300 may determine at least one center point based on the center of gravity information.

In an embodiment, the first joint may be a joint in which an amount of change in a position and a speed among the plurality of joints for motion is greater than or equal to a preset first reference, and the second joint may be a joint in which an amount of change in a position and a speed among the plurality of joints for motion is smaller than or equal to a preset second reference. For example, the dynamic point may be a left hand joint (or right hand joint) of the character, and the reference point may be a right shoulder joint (or left shoulder joint) of the character. Further, the dynamic point may be a left foot joint (or right foot joint) of the character, and the reference point may be a left pelvis joint (or right pelvis joint) of the character.

In step S3500, the haptic providing device 1100 based on character motion may calculate a rendering point for generating haptic vibration based on the dynamic point, the reference point, and the center point.

In an embodiment, the haptic providing device 1100 based on character motion may determine feature points of the polygon consisting of a dynamic point, a reference point, and a center point based on a position, a speed, and a movement direction of each of the dynamic point, the reference point and the center point, and may calculate them as the rendering points.

In step S3600, the haptic providing device 1100 based on character motion may control a plurality of haptic devices to provide haptics corresponding to motion of the character based on the rendering points.

In an embodiment, the haptic providing device 1100 based on character motion may generate a haptic effect at the rendering points by controlling vibration intensity and time of at least one haptic device.

In an embodiment, the plurality of haptic devices may be disposed at different positions from a user.

Figure 5:
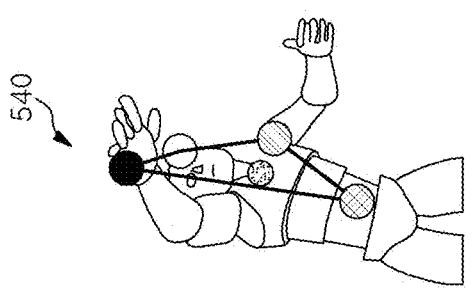
Figure 5:
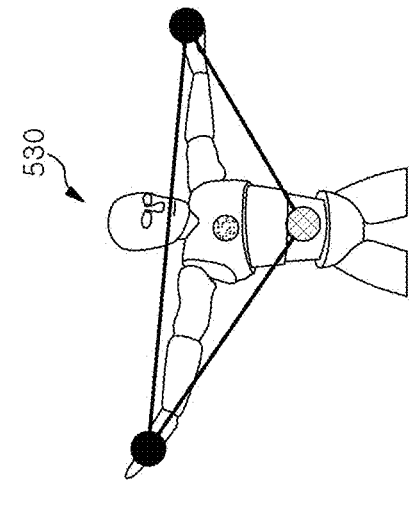
Figure 5:
Figure 5:
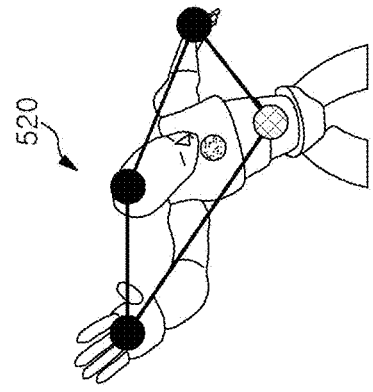
Figure 5:
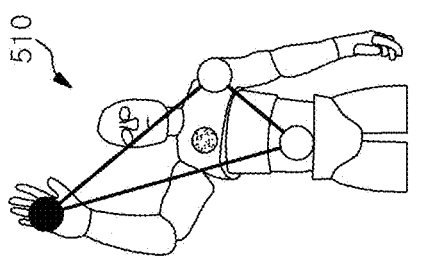

FIGS. 4 and 5 are diagrams for explaining extraction of a rendering point according to an embodiment of the present disclosure.

Referring to FIG. 4, the haptic providing device 1100 based on character motion may extract a dynamic point (Active Joint; $J_A$), a reference point (Root Joint; $J_R$) and a center point (Torso Center of Mass; $J_T$), based on skeleton data for the character 400 performing motion. The haptic providing device 1100 based on character motion may determine each of the character's left hand joint and head joint as the dynamic point $J_A$, and may determine the character's right shoulder joint as the reference point $J_A$. In addition, the haptic providing device 1100 based on character motion may determine Danjeon, which is the center of gravity of the upper body, as the central point $J_T$, because motion of the character is for the upper body part. The haptic providing device 1100 based on character motion may generate a triangular first polygon 410 by connecting the left hand joint, which is the first dynamic point, the right shoulder joint, which is the reference point, and the center of gravity of the upper body. In addition, the haptic providing device 1100 based on character motion may form a triangular second polygon 420 by connecting the head joint, which is the second dynamic point, the right shoulder joint, which is the reference point, and the center of gravity of the upper body. The haptic providing device 1100 based on character motion may determine the feature points (or center points) of the first polygon 410 and the second polygon 420 as the rendering points.

Further, FIG. 5 shows an example of extracting rendering points for each of four motions 510, 520, 530, 540, wherein the haptic providing device 1100 based on character motion may extract the rendering points for the motions according to the method described with reference to FIG. 4.

Figure 6:
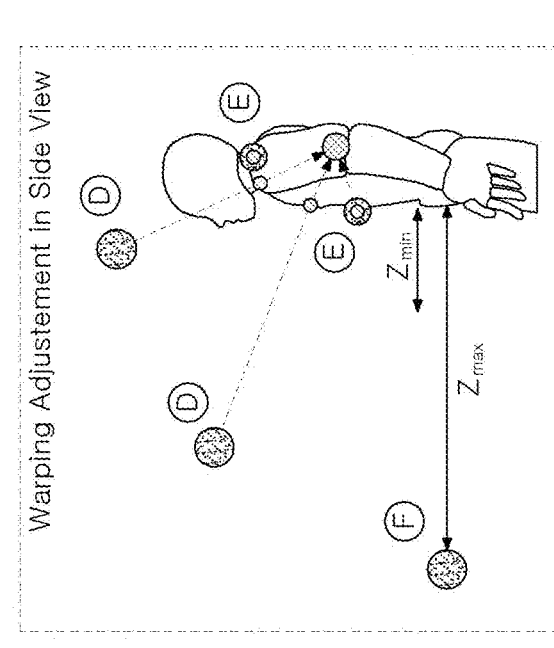
FIGS. 6 and 7 are diagrams for explaining an example of providing haptics according to an embodiment of the present disclosure.
Figure 6:
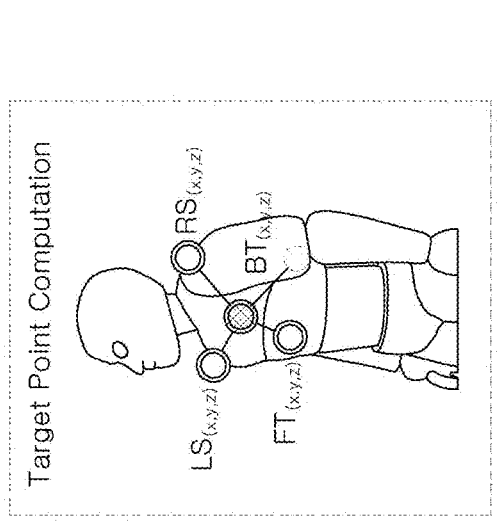
Figure 6:
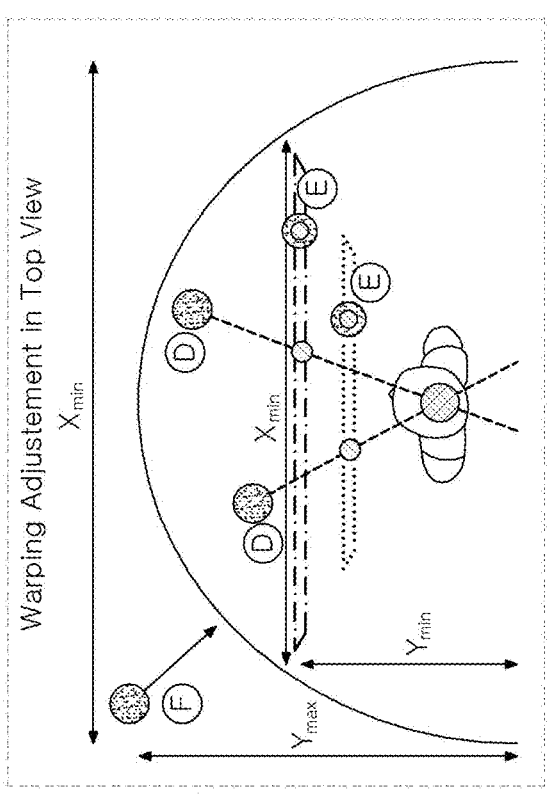
Figure 7:
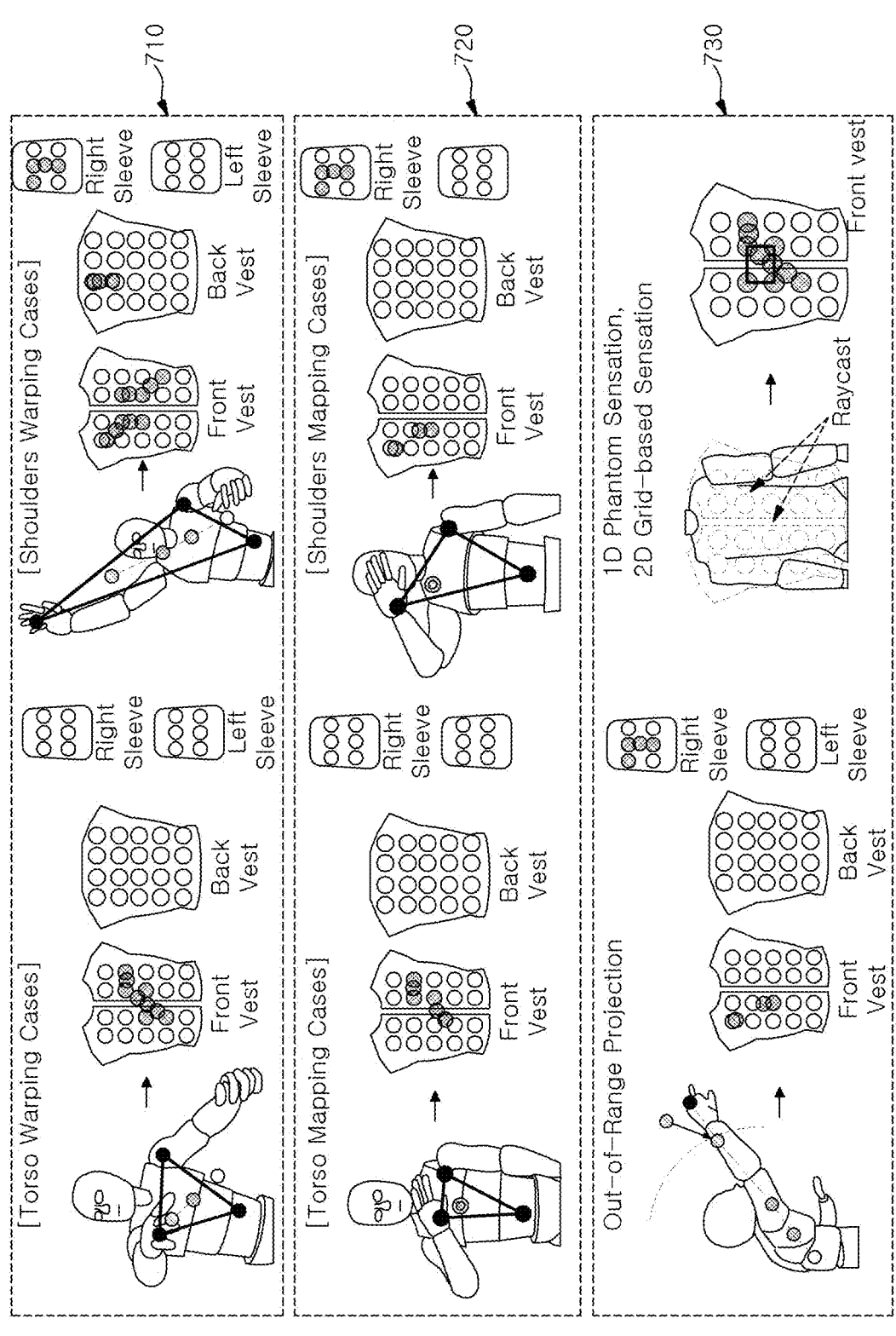

FIGS. 6 and 7 are diagrams for explaining an example of providing haptics according to an embodiment of the present disclosure.

Referring to FIG. 6, the haptic providing device 1100 based on character motion may form Raycast by connecting the extracted rendering points with a center point (Target Point) within the character's body. Herein, the points targeted by the Raycast may be a zone where the haptics are activated within the haptic device (e.g., a haptic vest). In case the rendering points are disposed far away, the haptic providing device 1100 based on character motion may set a maximum boundary so that the rendering points can be rendered for all points existing within a 3D space, and may perform a warping method that projects the rendering points within the maximum boundary onto the haptic vest. In addition, in case the rendering points are disposed close to the haptic vest, that is, within a minimum distance (minimum boundary), the haptic providing device 1100 based on character motion may generate the haptics at a position of the haptic vest corresponding to the rendering points.

Referring to FIG. 7, a first example 710 shows a case where the rendering points positioned at the maximum boundary of ROM are projected overall to the center of gravity and the shoulder and are warped. A second example 720 shows a case where the rendering points positioned at the minimum boundary generate haptics at a position of the haptic vest corresponding to the position of the rendering points. A third example 730 shows a case where the rendering points positioned beyond the maximum boundary are warped by calculating the closest distance to the boundary.

Figure 8:
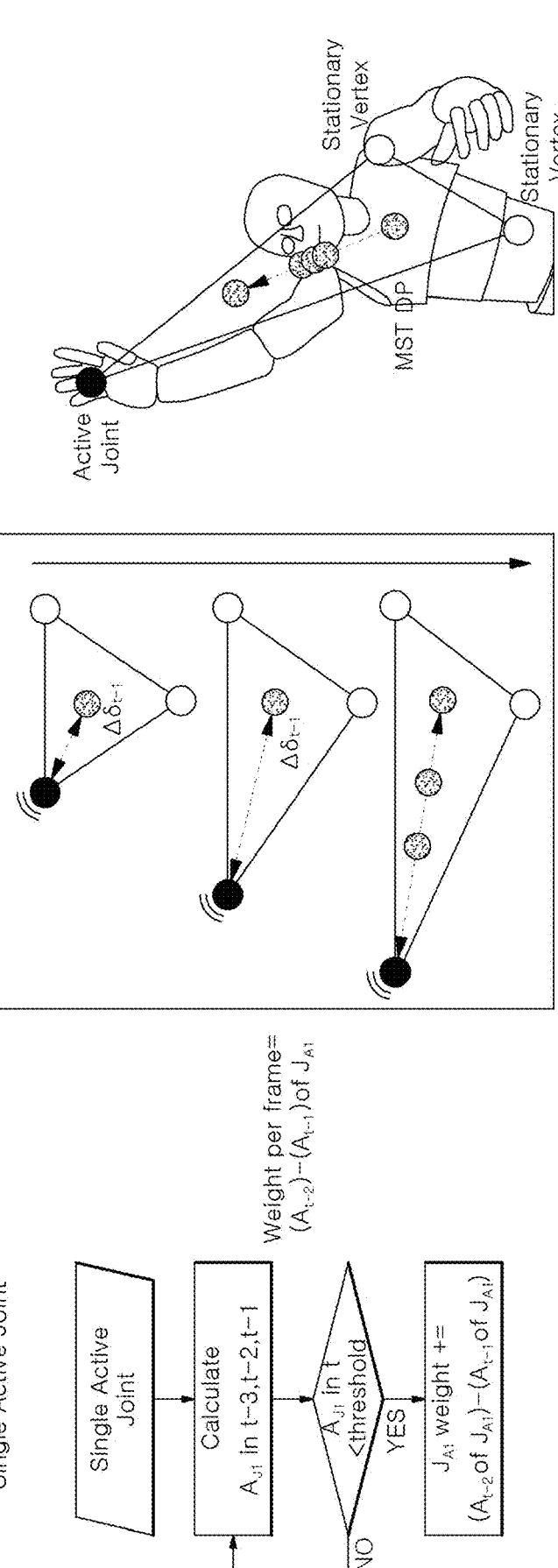
FIGS. 8 and 9 are diagrams for explaining an example of assigning weights according to the number of dynamic points.
Figure 9:

FIGS. 8 and 9 are diagrams for explaining an example of assigning weights according to the number of dynamic points.

FIG. 8 shows a case where the dynamic point is a single. An acceleration value of the dynamic point (Active joint) is calculated in real time, and if it exceeds a preset acceleration value, the dynamic point is determined to proceed with active motion, and a weighted value can be calculated from the preset value so that the rendering point (MSP dynamic point) can move in a direction of the dynamic point.

FIG. 9 shows a case where the dynamic point is dual. The dual dynamic points can reflect a weighted value based on a distance away from the position of the center point.

Therefore, according to the present disclosure, it is possible to extract the rendering points for dynamic motion that actively move both hands and provide the haptics based on these rendering points.

Figure 10:
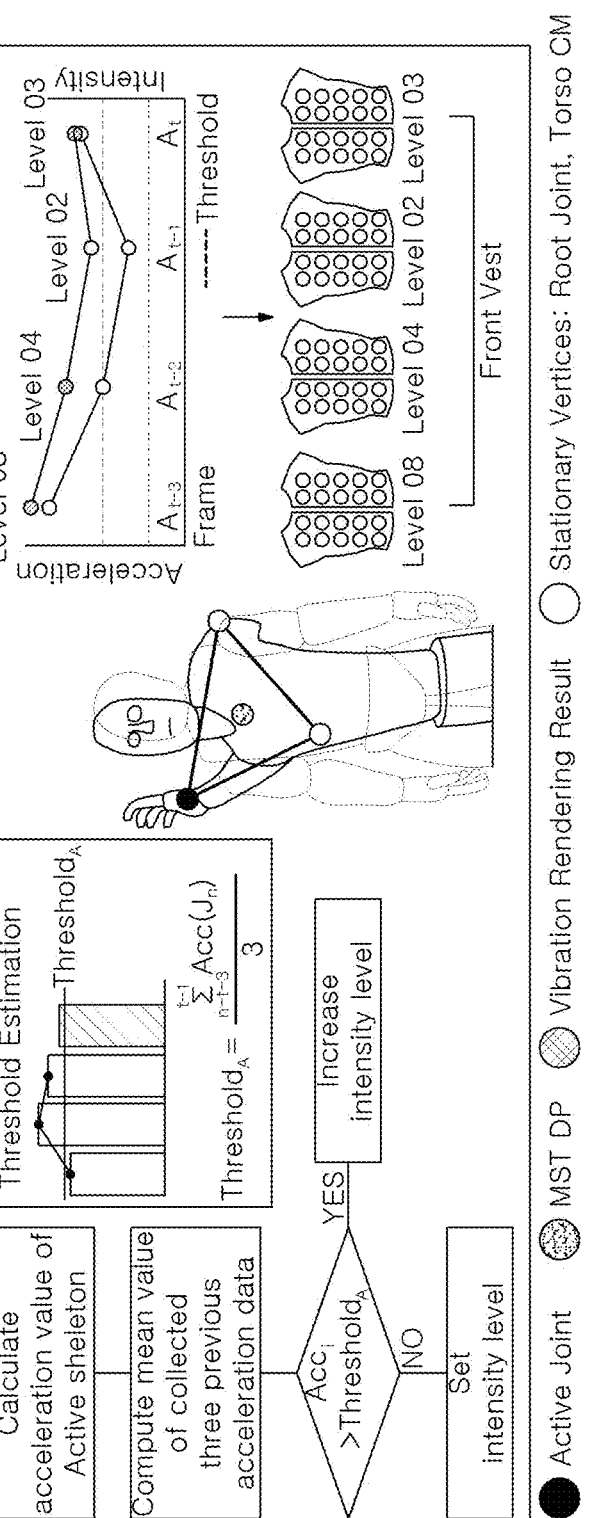
FIG. 10 is a diagram for explaining an example of controlling intensity of haptic vibration according to an embodiment of the present disclosure.

FIG. 10 is a diagram for explaining an example of controlling intensity of haptic vibration according to an embodiment of the present disclosure.

Referring to FIG. 10, a distance between the rendering point and the center point can be calculated in real time to generate the intensity of haptic vibration which is proportionate to the distance value. In addition, by calculating acceleration values of three consecutive frames constituting motion based on calculation of the acceleration value of the dynamic point, the intensity of haptic vibration can be increased when these acceleration values become greater than a preset reference value.

Therefore, according to the present disclosure, it is possible to adjust an effective intensity of haptic vibration for the rendering points moving away at the same speed.

Figure 11:
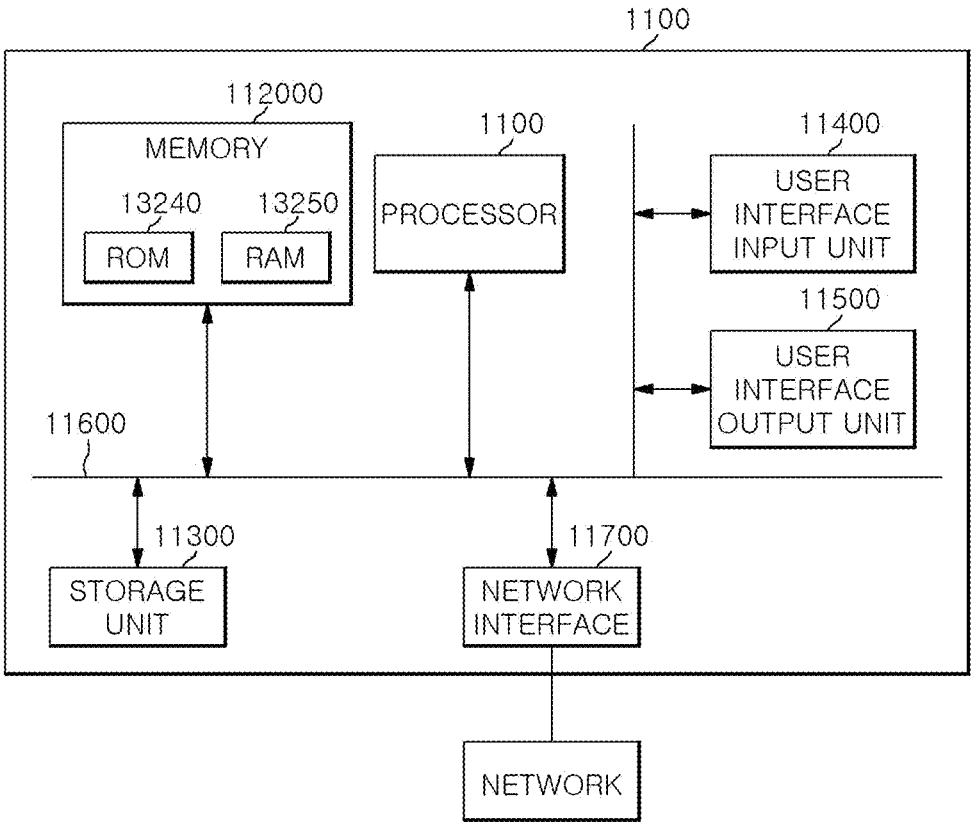
FIG. 11 is a block diagram of a haptic providing device based on character motion according to another embodiment of the present disclosure.

FIG. 11 is a block diagram of a haptic providing device based on character motion according to another embodiment of the present disclosure.

As shown in FIG. 11, the haptic providing device 1100 based on character motion may include at least one or more elements of a processor 11100, a memory 11200, a storage unit 11300, a user interface input unit 11400, and a user interface output unit 11500, wherein they can communicate with each other through a bus 11600. In addition, the haptic providing device 1100 based on character motion may also include a network interface 11700 for connecting to a network. The processor 11100 may be a CPU or a semiconductor device that executes processing commands stored in the memory 11200 and/or the storage unit 11300. The memory 11200 and the storage unit 11300 may include various types of volatile/non-volatile memory media. For example, the memory may include ROM 11240 and RAM 11250.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method for providing haptics based on character motion, the method comprising:
   obtaining skeleton data for motion of a character included in contents;
   determining a dynamic point, a reference point, and a center point for the motion of the character based on the skeleton data;
   calculating a rendering point for generating haptic vibration based on the dynamic point, the reference point, and the center point; and
   generating the haptic vibration at a position corresponding to the motion within at least one of haptic devices worn on a user, an animal, or an object based on the rendering point,
   wherein determining the dynamic point, the reference point, and the center point includes:
      from the skeleton data, determining joint information about the character that constitutes the motion and center of gravity information about the character during the motion,
      determining a first joint as the dynamic point and a second joint as the reference point among a plurality of joints of the character, based on the joint information that comprises a position and a speed of each of the plurality of joints of the character, and
      determining the center point based on the center of gravity information,
   wherein the first joint is set as a joint in which an amount of change in the position and the speed among the plurality of joints during the motion is greater than or equal to a preset first reference, and
wherein the second joint is set as a joint in which an amount of change in the position and the speed among the plurality of joints during the motion is smaller than or equal to a preset second reference.

2. The method of claim 1, wherein the joint information further includes a movement direction of each of the plurality of joints of the character that constitutes the motion, and
   wherein the center of gravity information includes at least one of a position, a speed, and a movement direction of the center of gravity for a body part of the character that constitutes the motion.

3. The method of claim 1, wherein the dynamic point is set as a left hand joint or a right hand joint of the character, and the reference point is set as a right shoulder joint or a left shoulder joint of the character.

4. The method of claim 1, wherein the dynamic point is set as a left foot joint or a right foot joint of the character, and
   wherein the reference point is set as a left pelvic joint or a right pelvic joint of the character.

5. The method of claim 1, wherein calculating the rendering point includes determining a feature point of a polygon including the dynamic point, the reference point, and the center point, based on a position, a speed, and a movement direction of each of the dynamic point, the reference point, and the center point, and calculating the feature point as the rendering point.

6. The method of the claim 1, wherein calculating the rendering point includes calculating the rendering point according to the following Equation:

$$MSP_{DP} = J_c + \frac{(J_A - J_C) \cdot w_{Active} + (J_R - J_c) \cdot w_{Root} + (J_T - J_c) \cdot w_{Torso}}{w_{Active} + w_{Root} + w_{Torso}}$$

(where $MSP_{DP}$ is a rendering point, $J_A$ is a dynamic point, $J_C$ is a center of gravity before performing motion of the character, $J_R$ is a reference point, $J_T$ is a center point, $W_{Active}$ is a weighted value of the dynamic point, $W_{Root}$ is a weighted value of the reference point, and $W_{Torso}$ is a weighted value of the center point.

7. The method of claim 1, wherein generating the haptic vibration includes generating a haptic effect at the rendering point to control vibration intensity and time of at least one of the haptic devices respectively disposed at different positions.

8. A device for providing haptics based on character motion, the device comprising:
   a memory configured to store one or more instructions; and
   one or more processors configured to execute the one or more instructions to:
      obtain skeleton data for motion of a character included in contents;
      determine a dynamic point, a reference point, and a center point for the motion of the character based on the skeleton data;
      calculate a rendering point for generating haptic vibration based on the dynamic point, the reference point, and the center point; and
      generate the haptic vibration at a position corresponding to the motion within at least one of haptic devices worn on a user, an animal, or an object based on the rendering point,

wherein at least one of the one or more processors is configured to:

determine joint information about the character that constitutes the motion and center of gravity information about the character during the motion from the skeleton data, determine a first joint as the dynamic point and a second joint as the reference point among a plurality of joints of the character, based on the joint information that comprises a position and a speed of each of the plurality of joints of the character, and determine the center point based on the center of gravity information, wherein the first joint is configured to be set as a joint in which an amount of change in the position and the speed among the plurality of joints during the motion is greater than or equal to a preset first reference, and wherein the second joint is configured to be set as a joint in which an amount of change in the position and the speed among the plurality of joints during the motion is smaller than or equal to a preset second reference.

9. The device of claim 8, wherein the joint information further includes a movement direction of each of the plurality of joints of the character that constitutes the motion, and wherein the center of gravity information includes at least one of a position, a speed, and a movement direction of the center of gravity for a body part of the character that constitutes the motion.

10. The device of claim 8, wherein the dynamic point is configured to be set as a left hand joint or a right hand joint of the character, and the reference point is configured to be set as a right shoulder joint or a left shoulder joint of the character.

11. The device of claim 8, wherein the dynamic point is configured to be set as a left foot joint or a right foot joint of the character, and wherein the reference point is configured to be set as a left pelvic joint or a right pelvic joint of the character.

12. The device of claim 8, wherein at least one of the one or more processors is configured to determine a feature point of a polygon including the dynamic point, the reference point, and the center point, based on a position, a speed, and a movement direction of each of the dynamic point, the reference point, and the center point, and calculate the feature point as the rendering point.

13. The device of the claim 8, wherein at least one of the one or more processors is configured to calculate the rendering point according to the following Equation:

14

$$MSP_{DP} = J_c + \frac{(J_A - J_C) \cdot w_{Active} + (J_R - J_c) \cdot w_{Root} + (J_T - J_c) \cdot w_{Torso}}{w_{Active} + w_{Root} + w_{Torso}}$$

(where $MSP_{DP}$ is a rendering point, $J_A$ is a dynamic point, $J_C$ is a center of gravity before performing motion of the character, $J_R$ is a reference point, $J_T$ is a center point, $W_{Active}$ is a weighted value of the dynamic point, $W_{Root}$ is a weighted value of the reference point, and $W_{Torso}$ is a weighted value of the center point.

14. The device of claim 8, wherein at least one of the one or more processors is configured to generate a haptic effect at the rendering point to control vibration intensity and time of at least one of the haptic devices respectively disposed at different positions.

15. A non-transitory computer readable storage medium storing computer executable instructions, when executed by one or more processors, causing the one or more processors to perform a method comprising:

obtaining skeleton data for motion of a character included in contents;

determining a dynamic point, a reference point, and a center point for the motion of the character based on the skeleton data;

calculating a rendering point for generating haptic vibration based on the dynamic point, the reference point, and the center point; and generating the haptic vibration at a position corresponding to the motion within at least one of haptic devices worn on a user, an animal, or an object based on the rendering point, wherein determining the dynamic point, the reference point, and the center point includes:

from the skeleton data, determining joint information about the character that constitutes the motion and center of gravity information about the character during the motion, determining a first joint as the dynamic point and a second joint as the reference point among a plurality of joints of the character, based on the joint information that comprises a position and a speed of each of the plurality of joints of the character, and determining the center point based on the center of gravity information, wherein the first joint is set as a joint in which an amount of change in the position and the speed among the plurality of joints during the motion is greater than or equal to a preset first reference, and wherein the second joint is set as a joint in which an amount of change in the position and the speed among the plurality of joints during the motion is smaller than or equal to a preset second reference.

* * * * *